(12) United States Patent
Taniguchi

(10) Patent No.: US 9,601,724 B2
(45) Date of Patent: Mar. 21, 2017

(54) PACKAGING MATERIAL FOR LITHIUM ION BATTERY

(71) Applicant: TOPPAN PRINTING CO., LTD., Tokyo (JP)

(72) Inventor: Tomoaki Taniguchi, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 0 days.

(21) Appl. No.: 14/266,157

(22) Filed: Apr. 30, 2014

(65) Prior Publication Data

US 2014/0234698 A1 Aug. 21, 2014

Related U.S. Application Data

(63) Continuation of application No. PCT/JP2012/078469, filed on Nov. 2, 2012.

(30) Foreign Application Priority Data

Nov. 7, 2011 (JP) .................................. 2011-243583

(51) Int. Cl.

| | | |
|---|---|---|
| *H01M 2/02* | (2006.01) | |
| *B32B 7/12* | (2006.01) | |
| *B32B 15/08* | (2006.01) | |
| *B32B 15/18* | (2006.01) | |
| *B32B 15/20* | (2006.01) | |
| *B32B 27/32* | (2006.01) | |
| *B32B 27/34* | (2006.01) | |
| *B32B 27/36* | (2006.01) | |
| *H01M 10/052* | (2010.01) | |

(52) U.S. Cl.
CPC ............ *H01M 2/0287* (2013.01); *B32B 7/12* (2013.01); *B32B 15/08* (2013.01); *B32B 15/18* (2013.01); *B32B 15/20* (2013.01); *B32B 27/32* (2013.01); *B32B 27/34* (2013.01); *B32B 27/36* (2013.01); *B32B 2255/06* (2013.01); *B32B 2255/26* (2013.01); *B32B 2307/714* (2013.01); *B32B 2457/10* (2013.01); *B32B 2553/00* (2013.01); *H01M 10/052* (2013.01); *H01M 2002/0297* (2013.01)

(58) Field of Classification Search
None
See application file for complete search history.

(56) References Cited

U.S. PATENT DOCUMENTS

| | | | |
|---|---|---|---|
| 2010/0119821 A1* | 5/2010 | Uemura | C08G 18/10 428/355 N |
| 2010/0227213 A1 | 9/2010 | Hata | |
| 2011/0064946 A1* | 3/2011 | Kai | C09J 7/025 428/345 |

FOREIGN PATENT DOCUMENTS

| | | |
|---|---|---|
| JP | 11-185718 | 7/1999 |
| JP | 2000-123800 | 4/2000 |
| JP | 2001-172600 | 6/2001 |
| JP | 2011-60501 | 3/2011 |
| JP | 2011-129404 | 6/2011 |
| JP | 2011-187385 | 9/2011 |
| JP | 2011-216390 | 10/2011 |
| JP | 2012-203985 | 10/2012 |
| JP | 2013-6412 | 1/2013 |

OTHER PUBLICATIONS

JP 2011-060501—Translation.*
International Search Report mailed Jan. 22, 2013 in corresponding International Patent Application No. PCT/JP2012/078469.
Extended European Search Report dated Jul. 6, 2015 in corresponding European Patent Application No. 12847876.5.

* cited by examiner

*Primary Examiner* — Ladan Mohaddes

(57) ABSTRACT

A packaging material for a lithium ion battery includes at least a first adhesive layer, a metal foil layer, a corrosion prevention-treated layer, a second adhesive layer, and a sealant layer which are sequentially laminated on one surface of a base material layer. The thickness of the base material layer is 15 to 40 μm.

2 Claims, 1 Drawing Sheet

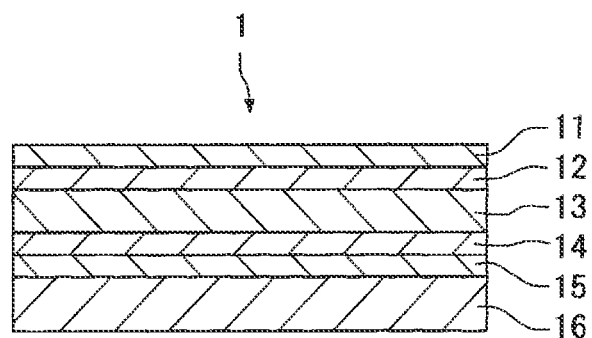

PACKAGING MATERIAL FOR LITHIUM ION BATTERY

CROSS REFERENCE TO RELATED APPLICATIONS

This application is a continuation application based on a PCT Patent Application No. PCT/JP2012/078469, filed Nov. 2, 2012, whose priority is claimed on Japanese Patent Application No. 2011-243583 filed on Nov. 7, 2011, the contents of which are hereby incorporated by reference in their entirety.

BACKGROUND OF THE INVENTION

Field of the Invention

The present invention relates to a packaging material for a lithium ion battery.

Description of the Related Art

As secondary batteries, nickel hydrogen storage batteries and lead storage batteries are known, but miniaturization of the secondary batteries is necessary due to miniaturization of portable devices, restriction on installation space, and the like, and thus lithium ion batteries having a high energy density have attracted attention. As a packaging material for a lithium ion battery (hereinafter, also simply referred to as "packaging material") which is used in lithium ion batteries, a metal casing is used in the related art. However, recently, a multi-layer film, which is light weight, has high heat dissipation properties, and is capable of supporting the packaging material at a low cost, has been used.

An electrolytic solution of lithium ion batteries is composed of an aprotic solvent such as propylene carbonate, ethylene carbonate, dimethyl carbonate, diethyl carbonate, and ethyl methyl carbonate, and an electrolyte. In addition, as a lithium salt that is the electrolyte, a lithium salt such as $LiPF_6$ and $LiBF_4$ is used. However, the lithium salt generates hydrofluoric acid through a hydrolysis reaction due to moisture, and thus corrosion in a metallic surface of a battery member due to the hydrofluoric acid or a reduction in lamination strength between the layers of the packaging material constituted by the multi-layer film may be caused. Therefore, the packaging material constituted by the multi-layer film is generally provided with an aluminum foil layer at the inside to suppress intrusion of moisture from an outer surface of the multi-layer film. For example, a packaging material for a lithium ion battery is known in which a base material layer having heat resistance/a first adhesive layer/an aluminum foil layer/a corrosion prevention-treated layer that prevents corrosion due to hydrofluoric acid/a second adhesive layer/a sealant layer are sequentially laminated. A lithium ion battery using the packaging material for a lithium ion battery is called an aluminum laminated lithium ion battery.

The packaging material constituted by the laminated film is largely classified into two types according to the kind of the second adhesive layer. That is, the packaging material is largely classified into a dry laminate configuration using an adhesive for dry laminate for the second adhesive layer, and a thermal laminate configuration using a thermoplastic material such as an acid-modified polyolefin-based resin for the second adhesive layer. The adhesive that is used in the dry laminate configuration has a highly hydrolysable bonding site such as an ester group and a urethane group, and thus a hydrolysis reaction due to hydrofluoric acid tends to occur. Therefore, a packaging material having the thermal laminate configuration is used in a use in which further higher reliability is demanded.

For example, the aluminum laminated lithium ion battery is formed as follows. A recessed portion is formed at part of the packaging material constituted by the multi-layer film by cold-molding in such a manner that the sealant layer is located on an inner side. A positive electrode, a separator, a negative electrode, and an electrolytic solution are put into the recessed portion. Then, the other portions of the packaging material are folded back and the same folded sealant layers at edge portions are heat sealed together for hermetic sealing. Recently, in order to efficiently accommodate an even larger amount of contents so as to increase an energy density, a lithium ion battery has been manufactured, in which the recessed portions are provided at both portions of the packaging material for a lithium ion battery, which are to be bonded to each other.

As a method of further increasing the energy density of the lithium ion battery, a method of increasing the contents accommodated in the recessed portion by making the recessed portion formed by the cold-molding even deeper may be exemplified. However, when the recessed portion is made deep, a pin hole or fracturing tends to occur at a side or a corner portion of the recessed portion during molding performed using a mold because the side or the corner portion is a portion in which a degree of stretching is particularly high.

As a packaging material in which moldability is improved, for example, a packaging material using a polyamide film, in which tensile strength or elongation up to fracturing in four directions (0°, 45°, 90°, and 135°) is controlled in a specific range, as the base material layer is known (refer to Japanese Patent No. 3567230). In addition, in order for the packaging material to resist deterioration even when the electrolytic solution adheres to an outermost surface during battery manufacturing, a packaging material using a laminated film, in which a polyethylene terephthalate film is laminated on an outer side of the polyamide film, as a base material layer is also known.

However, even when using the polyamide film in the base material layer as described above, it is difficult to say that durability after molding is sufficient. In addition, even when pin holes or fracturing does not occur during molding, peeling may occur between the base material layer and a metal foil layer after molding.

SUMMARY OF THE INVENTION

An object of the invention is to provide a packaging material for a lithium ion battery which is excellent in moldablity and durability after molding, and in which peeling hardly occurs between a base material layer and a metal foil layer after cold-molding.

The invention employs the following configuration to accomplish the object.

According to an aspect of the invention, there is provided a packaging material for a lithium ion battery including at least a first adhesive layer, a metal foil layer, a corrosion prevention-treated layer, a second adhesive layer, and a sealant layer which are sequentially laminated on one surface of a base material layer. The thickness of the base material layer is 15 to 40 mm. When performing stretching according to the following stretching method in such a manner that an amount of elongation becomes 5 mm, adhesivity between the base material layer and the metal foil layer is 5 N or less in the following adhesivity test, and when performing the stretching according to the following stretching method in such a manner that the amount of elongation becomes 10 mm, the adhesivity between the base material layer and the metal foil layer is 2 N or more in the following adhesivity test.

In the stretching method, the test specimen is cut from the packaging material for a lithium ion battery to have a sample width of 6 mm, the test specimen is mounted on chucks of a stretching machine with a distance between the chucks set to 10 mm, and the test specimen is stretched at a stretching rate of 300 mm/minute.

In the adhesivity test, a notch is formed between the base material layer and the metal foil layer of the test specimen stretched by the stretching method, the base layer and a laminated portion from the metal foil layer to the sealant layer are gripped, respectively, and the test specimen, which is stretched in the stretching method, is subjected to T-type peeling under a condition of a peeling rate of 30 mm/minute to measure adhesivity.

In the packaging material for a lithium ion battery according to the aspect of the invention, in the stretching method, when the test specimen is stretched until the test specimen is fractured, an amount of elongation of the test specimen may be 10 to 20 mm.

In the packaging material for a lithium ion battery according to the aspect of the invention, the first adhesive layer may be a layer formed from a two-liquid curable urethane-based adhesive which allows bifunctional or more aromatic or aliphatic isocyanate, which serves as a curing agent, to act on a main agent including polyol, and a molar ratio (NCO/OH) between a hydroxyl group of the main agent and an isocyanate group of the curing agent may be 20 to 40.

In the packaging material for a lithium ion battery according to the aspect of the invention, the base material layer may be a single-layer film constituted by a polyamide film or a laminated film in which a polyester film and a polyamide film are laminated from an outer side.

Advantageous Effects of Invention

The packaging material for a lithium ion battery according to the aspect of the invention is excellent in moldability and durability after molding, and thus peeling hardly occurs between a base material layer and a metal foil layer after cold-molding.

BRIEF DESCRIPTION OF THE DRAWINGS

FIG. 1 is a cross-sectional diagram illustrating an example of a packaging material for a lithium ion battery of the invention.

DETAILED DESCRIPTION OF THE INVENTION

Hereinafter, an example of an embodiment of a packaging material for a lithium ion battery of the invention will be described in detail.

As shown in FIG. 1, the packaging material 1 for lithium ion batteries (hereinafter, referred to as "packaging material 1") of this embodiment is a laminated body in which a base material layer 11, a first adhesive layer 12, a metal foil layer 13, a corrosion prevention-treated layer 14, a second adhesive layer 15, and a sealant layer 16 are sequentially laminated. The base material layer 11 is disposed on an outer side of the packaging material 1, and the sealant layer 16 is disposed on an inner side of the packaging material 1.

(Base Material Layer 11)

The base material layer 11 provides heat resistance in a sealing process during manufacturing of the lithium ion batteries and plays a role of suppressing occurrence of pin holes which may occur during processing or distribution. The base material layer 11 is preferably formed from a polyamide film or a polyester film in consideration of improvement in piercing strength or impact strength.

Examples of the polyamide resin that forms the polyamide film include nylon 6, nylon 11, nylon 12, nylon 66, nylon 610, nylon 612, and the like. Among these, the nylon 6 is preferable from the viewpoint of improvement in moldability.

Examples of the polyester resin that forms the polyester film include polyethylene terephthalate, polyethylene naphthalate, and the like. Among these, the polyethylene terephthalate is preferable in consideration of easiness of handling.

In addition, the base material layer 11 may be a single-layer film or a laminated film. In a case where the base material layer 11 is configured as a single-layer film, the polyamide film is preferable in consideration of improvement in the moldability. In a case where the base material layer 11 is configured as the laminated film, a laminated film in which a polyester film and a polyamide film are laminated from an outer side is preferable considering that even when an electrolytic solution adheres to an outer surface of the packaging material 1, it is easy to suppress damage to an external shape.

A film that is used for the base material layer 11, a non-stretched film or a stretched film may be used. However, the stretched film is preferable, and a biaxially-stretched film is more preferable in consideration of improvement in strength and heat resistance.

The thickness of the base material layer 11 is set to 15 µm or more and preferably 25 µm or more considering that excellent moldability can be obtained. In addition, the thickness of the base material layer 11 is set to 40 µm or less, and more preferably 35 µm or less considering that a contraction force at a portion which is particularly stretched during cold-molding can be made to be small, and thus a shape after molding is maintained, and occurrence of peeling between the base material layer 11 and the metal foil layer 13 can be suppressed.

(First Adhesive Layer 12)

The first adhesive layer 12 is a layer that bonds the base material layer 11 and the metal foil layer 13.

As an adhesive component that constitutes the first adhesive layer 12, a two-liquid curable urethane-based adhesive which allows bifunctional or more aromatic or aliphatic isocyanate, which serves as a curing agent, to act on a main agent including polyol such as polyester polyol, polyether polyol, and acrylic polyol is preferable considering that strong adhesiveness and molding followability can be obtained.

With regard to the urethane-based adhesive, for example, when performing aging at 40° C. for 4 or more days after coating, reaction between a hydroxyl group of the main agent and an isocyanate group of the curing agent progresses, and thus strong adhesion is possible.

In the urethane-based adhesive, it is preferable that a molar ratio (NCO/OH) of the isocyanate group of the curing agent to the hydroxyl group of the main agent be 20 or more, and more preferably 25 or more. The molar ratio (NCO/OH) in the two-liquid curable urethane-based adhesive that is used as the first adhesive layer of the packaging material is typically 1 to 10. However, when the molar ratio (NCO/OH)

is set to be 20 or more, generation of a urea bond, a burette bond, and an allophanate bond is promoted in addition to the a urethane bond, and thus the adhesion between the base material layer 11 and the metal foil layer 13 becomes stronger. As a result, it is easy to suppress occurrence of peeling between the base material layer 11 and the metal foil layer 13 after molding.

In addition, the molar ratio (NCO/OH) is more preferably 40 or less and even more preferably 35 or less. When the molar ratio (NCO/OH) is set to be 40 or less, an excessive increase in the percentage of the urea bond, the burette bond, and the allophanate bond with respect to the urethane bond is suppressed. Accordingly, the first adhesive layer 12 is suppressed from becoming hard and brittle, and flexibility is improved. As a result, it is easy to obtain excellent moldability.

It is preferable that the thickness of the first adhesive layer 12 be 1 to 10 μm, and more preferably 3 to 7 μm to obtain desired bonding strength and workability, or to reliably form the first adhesive layer 12 on a member without being peeled even when the member on which the first adhesive layer 12 is provided is deformed, and expanded or contracted.

(Metal Foil Layer 13)

As the metal foil layer 13, various kinds of metal foil of aluminum, stainless steel, and the like may be used, and the aluminum foil is preferable in consideration of a moisture proof property, workability such as spreadability and the cost. As the aluminum foil, typical soft aluminum foil may be used. In addition, a layer using aluminum foil that contains iron is preferable considering that resistance to pinhole and the spreadability during molding may be provided.

In this case, the iron content in the aluminum foil (100% by mass) is preferably 0.1% by mass to 9.0% by mass, and more preferably 0.5% by mass to 2.0% by mass. When the iron content is 0.1% by mass or more, the resistance to pinhole and the spreadability are improved. When the iron content is 9.0% by mass or less, the flexibility is improved.

The thickness of the metal foil layer 13 is preferably 9 to 200 μm, and more preferably 15 to 100 μm in consideration of barrier properties, resistance to pinhole, and workability.

(Corrosion Prevention-Treated Layer 14)

The corrosion prevention-treated layer 14 plays a role of suppressing corrosion of the metal foil layer 13 due to hydrofluoric acid that is generated by a reaction between the electrolytic solution and moisture, and a role of improving interaction between the metal foil layer 13 and the second adhesive layer 15 to improve the adhesivity.

As the corrosion prevention-treated layer 14, a coated film, which is formed by an acid-resistant corrosion prevention treating agent such as a coating agent or an immersion agent is preferable. When the corrosion prevention-treated layer 14 is constituted by the coated film, corrosion prevention effect of the metal foil layer 13 with respect to an acid is improved. Furthermore, when an anchor is formed in the metal foil layer 13, adhesivity between the metal foil layer 13 and the second adhesive layer 15 becomes stronger, and thus resistance of the packaging material with respect to contents such as the electrolytic solution is improved.

Examples of the coated film include a coated film which is formed by ceria sol treatment using a corrosion prevention treating agent composed of cerium oxide, a phosphate, and various thermosetting resins, a chromate treatment using a corrosion prevention treating agent composed of a chromate, a phosphate, a fluoride, and various thermosetting resins, and the like.

The corrosion prevention-treated layer 14 is not limited to the coated film that is formed by the treatment as long as corrosion resistance of the metal foil layer 13 is sufficiently obtained. For example, the corrosion prevention-treated layer 14 may be a layer that is formed by a phosphate treatment, a boehmite treatment, or the like.

The corrosion prevention-treated layer 14 may be constituted by a single layer or a plurality of layers. In addition, an additive such as a silane-based coupling agent may be added to the corrosion prevention-treated layer 14.

The thickness of the corrosion prevention-treated layer 14 is preferably 10 nm to 5 μm, and more preferably 20 to 500 nm in consideration of a corrosion prevention function and a function as an anchor.

(Second Adhesive Layer 15)

The second adhesive layer 15 is a layer that is formed between the sealant layer 16 and the corrosion prevention-treated layer 14. The second adhesive layer 15 is largely classified into two kinds including a thermal laminated configuration and a dry laminated configuration according to the kind of adhesive components.

As the adhesive component of the second adhesive layer 15 having the thermal laminate configuration, an acid-modified polyolefin-based resin obtained by modifying a polyolefin-based resin with an acid is preferable. When a part of non-polar polyolefin-based resin is modified with an acid and thus a polar group is provided, stronger adhesion between the non-polar sealant layer 16 and the polar corrosion prevention-treated layer 14 becomes possible. In addition, when using the acid-modified polyolefin-based resin, resistance of the packaging material with respect to contents such as the electrolytic solution is improved. Accordingly, even when hydrofluoric acid is generated at the inside, it is easy to prevent a decrease in adhesivity due to deterioration of the second adhesive layer 15.

The acid-modified polyolefin-based resin that is used in the second adhesive layer 15 may be one, two, or more kinds thereof.

Examples of the polyolefin-based resin include low-density, medium-density, and high-density polyethylenes, ethylene-α olefin copolymer, homo-, block-, or random polypropylene, propylene-α olefin copolymer, and the like. In addition, a copolymer obtained by copolymerizing a monomer that forms the polymer and the copolymer, and a monomer such as acrylic acid and methacrylic acid having polarity, a cross-linked polyolefin, and the like may be used.

Examples of the acid that modifies the polyolefin-based resin include carboxylic acid, an epoxy compound, an acid anhydride, and the like, and maleic anhydride is preferable.

As the adhesive component that constitutes the second adhesive layer 15 having the thermal laminated configuration, maleic anhydride-modified polyolefin-based resin, which is obtained by graft-modifying a polyolefin-based resin with maleic anhydride, is preferable considering that it is easy to maintain adhesivity between the sealant layer 16 and the metal foil layer 13 even when the electrolytic solution permeates the second adhesive layer 15, and maleic anhydride-modified polypropylene is particularly preferable.

A modification rate of the maleic anhydride-modified polypropylene by the malic anhydride (a mass of a portion derived from maleic anhydride with respect to the total mass of the maleic anhydride-modified polypropylene) is preferably 0.1% by mass to 20% by mass, and more preferably 0.3% by mass to 5% by mass.

In addition, it is preferable that styrene-based or olefin-based elastomers be contained in the second adhesive layer 15 having the thermal laminated configuration. According to this, it is easy to suppress whitening due to an occurrence of cracking in the second adhesive layer 15 during cold-molding, and improvement in adhesivity due to improvement in wettability, improvement in film forming properties due to reduction in anisotropy, and the like may be expected. It is preferable that these elastomers be dispersed and compatibilized in the acid-modified polyolefin-based resin in a nanometer order.

The second adhesive layer 15 having the thermal laminate configuration can be formed by extruding the adhesive component by an extruder.

A melt flow rate (MFR) of the adhesive component of the second adhesive layer 15 having the thermal laminate configuration is preferably 4 to 30 g/10 minutes under the conditions of 230° C. and 2.16 kgf.

The thickness of the second adhesive layer 15 having the thermal laminated configuration is preferably 2 to 50 μm.

Examples of the adhesive component of the second adhesive layer 15, which has the dry laminate configuration, include a two-liquid curable polyurethane-based adhesive similar to the adhesive component exemplified in the first adhesive layer 12. In this case, it is necessary to conduct composition optimization such as using of a main agent, which has a skeleton that is less likely to be hydrolyzed, in an adhesive, improving a cross-linking density, and the like so as to suppress swelling due to the electrolytic solution and hydrolysis due to hydrofluoric acid.

For example, as a method of improving the cross-linking density, a method of using dimer fatty acid, an ester- or hydrogen-additive of dimer fatty acid, reduced glycol of the dimer fatty acid, and reduced glycol of the ester or hydrogen-additive of dimer fatty acid may be exemplified. The dimer fatty acid can be obtained by dimerization of various unsaturated fatty acids, and examples of a structure of the dimer fatty acid include an acyclic shape, a monocyclic shape, a polycyclic shape, and an aromatic ring shape.

The thickness of the second adhesive layer 15 having the dry laminate configuration is preferably 1 to 10 μm, and more preferably 3 to 7 μm.

(Sealant Layer 16)

The sealant layer 16 is a layer that provides sealing properties by heat seal in the packaging material 1.

Examples of the sealant layer 16 include a film formed from a polyolefin-based resin or an acid-modified polyolefin-based resin obtained by graft-modifying the polyolefin-based resin with an acid such as maleic anhydride. Examples of the polyolefin-based resin include low-density, medium-density, and high-density polyethylenes, ethylene-α olefin copolymer, homo-, block-, or random polypropylene, propylene-α olefin copolymer, and the like. These polyolefin-based resins may be used alone or in combination of two or more kinds thereof.

The sealant layer 16 may be constituted by a single-layer film or a multi-layer film, and this film configuration may be selected in accordance with a necessary function. For example, a multi-layer film in which resins such as ethylene-cyclic olefin copolymer and polymethyl pentene are interposed may be provided when considering that the moisture proof property is provided.

In addition, various additives such as a flame retardant, a slipping agent, an anti-blocking agent, an antioxidant, a light stabilizer, and a tackifier may be mixed in the sealant layer 16.

The thickness of the sealant layer 16 is preferably 10 μm to 100 μm, and more preferably 20 to 60 μm.

In the packaging material 1, the sealant layer 16 may be laminated on the second adhesive layer 15 by dry lamination. However, it is preferable that the second adhesive layer 15 be formed from the acid-modified polyolefin-based resin and the sealant layer 16 be laminated by sandwich lamination in consideration of improvement in adhesiveness.

With regard to the packaging material 1, when performing stretching according to the following stretching method in such a manner that an amount of elongation of a test specimen of the packaging material becomes 5 mm (hereinafter, referred to as 5 mm stretching test), adhesivity between the base material layer and the metal foil layer is 5 N or less in the following adhesivity test. In addition, when performing the stretching according to the following stretching method in such a manner that the amount of elongation of the test specimen of the packaging material becomes 10 mm (hereinafter, referred to as 10 mm stretching test), the adhesivity between the base material layer and the metal foil layer is 2 N or more in the following adhesivity test. When satisfying the above-described conditions, it is possible to obtain excellent durability after molding and it is possible to suppress occurrence of peeling between the base material layer 11 and the metal foil layer 13 after molding.

(Stretching Method)

The test specimen of the packaging material (hereinafter, referred to as "test specimen") is cut from the packaging material 1 to have a sample width of 6 mm, the test specimen is mounted on chucks (test specimen fixing tools) of a stretching machine with a distance between the chucks (test specimen fixing tools) set to 10 mm, and the test specimen is stretched at a stretching rate of 300 mm/minute.

(Adhesivity Test)

A notch is formed between the base material layer 11 and the metal foil layer 13 of the test specimen stretched by the stretching method, the base material layer 11 and a laminated portion from the metal foil layer 13 to the sealant layer 16 are gripped, and adhesivity of the test specimen, which is stretched in the stretching method, is measured under the conditions of T-peeling and a peeling rate of 30 mm/minute.

The present inventors have made an investigation with respect to the cause of occurrence of the peeling between the base material layer and the metal foil layer after molding of the packaging material. As a result, they have obtained the following findings. Specifically, the present inventors have made an investigation with respect to a case in which the adhesivity exceeds 5 N when the test specimen is stretched by 5 mm (5 mm stretching test), and a case in which the adhesivity does not exceed 5 N. The present inventors have obtained the following finding. When the 10 mm stretching test is performed with respect to a test specimen in which the adhesivity exceeds 5 N, and a large shear stress is applied thereto, the adhesivity between the base material layer and the metal foil layer dramatically decreases.

That is, a comparison is made between a packaging material A in which the adhesivity between the base material layer and the metal foil layer exceeds 5 N in a state in which the test specimen is stretched by 5 mm, and a packaging material B in which the adhesivity between the base material layer and the metal foil layer is 5 N or less in a state in which the test specimen is stretched by 5 mm. When performing the 10 mm stretching test with respect to the test specimens of the packaging materials A and B, it has been found that the adhesivity of the packaging material B is higher than the adhesivity of the packaging material A.

The reason of this tendency is considered as follows. In cold-molding of the packaging material 1 during manufacturing of a battery, great stretching locally occurs at a corner portion of the recessed portion in the packaging material 1, and particularly, the corner portion is susceptible to a large shear stress. Accordingly, the above-described tendency has a great effect on the peeling between the base material layer and the metal foil layer. If the adhesivity when the test specimen is stretched by 5 mm (5 mm stretching test) is set to 5 N or less, the adhesivity when the test specimen is stretched by 10 mm (10 mm stretching test) can be made relatively higher. Furthermore, if the adhesivity when the test specimen is stretched by 10 mm is set to 2 N or more, even when a large shear stress is locally applied during the cold-molding, it is possible to obtain a packaging material in which a dramatic decrease in the adhesivity between the base material layer and the metal foil layer is suppressed, and which has excellent durability after molding.

The adhesivity when the test specimen is stretched by 5 mm can be adjusted by an adhesive component of the first adhesive layer 12. As a specific example, as a molar ratio (NCO/OH) of the urethane-based adhesive that forms the first adhesive layer 12 increases, there is a tendency for the adhesivity to decrease when the test specimen is stretched by 5 mm.

With regard to the adhesivity when the test specimen is stretched by 10 mm, as the adhesivity when the test specimen is stretched by 5 mm decreases, the adhesivity when the test specimen is stretched by 5 mm tends to be maintained.

The adhesivity when the test specimen is stretched by 5 mm is 5 N or less, and preferably 4.5 N or less considering that it is easy to maintain the adhesivity when the test specimen is stretched by 10 mm. In addition, the adhesivity when the test specimen is stretched by 5 mm is preferably 3.5 N or more and more preferably 4.0 N or more considering that the adhesivity when the test specimen is stretched by 10 mm is easily set to 2 N/mm or more.

The adhesivity when the test specimen is stretched by 10 mm is 2 N or more, and more preferably 2.5 N or more considering that the durability of the packaging material 1 is improved after molding. In addition, the adhesivity when the test specimen is stretched by 10 mm is preferably 3.5 N or less, and more preferably 3.0 N or less when considering that it is easy to sufficiently secure the maximum amount of elongation of the packaging material 1.

In addition, in the packaging material 1, it is preferable that the maximum amount of elongation in a case of being stretched under the same conditions as the above-described stretching method, that is, the amount of elongation of the test specimen until the packaging material 1 is fractured be 10 to 20 mm. When the maximum elongation amount of the test specimen is 10 mm or more, it is possible to obtain excellent moldability and thus fracturing is less likely to occur during molding. In addition, when the maximum amount of elongation of the test specimen is 20 mm or less, the first adhesive layer 12 tends to maintain appropriate hardness, and thus a decrease in the adhesivity between the base material layer 11 and the metal foil layer 13 after molding tends to be suppressed.

(Manufacturing Method)

Hereinafter, a method of manufacturing the packaging material 1 will be described. However, the method of manufacturing the packaging material 1 is not limited to the following method. As a method of manufacturing the packaging material 1, the following processes (1) to (3) may be exemplified.

(1) Process of forming the corrosion prevention-treated layer 14 on the metal foil layer 13.

(2) Process of bonding the base material layer 11 to a side of the metal foil layer 13, which is opposite to a side in which the corrosion prevention-treated layer 14 is formed, with the first adhesive layer 12 interposed therebetween.

(3) Process of bonding the sealant layer 16 to the corrosion prevention-treated layer 14 of the metal foil layer 13 with the second adhesive layer 15 interposed therebetween.

Process (1)

For example, a corrosion prevention treating agent is applied onto one surface of the metal foil layer 13 and is dried to form the corrosion prevention-treated layer 14. Examples of the corrosion prevention treatment agent include the corrosion prevention treating agent for the ceria sol treatment, the corrosion prevention treating agent for the chromate treatment, and the like.

A method of applying the corrosion prevention treating agent is not particularly limited, and various methods such as gravure coating, reverse coating, roll coating, and bar coating may be employed.

Process (2)

The base material layer 11 is bonded to a surface of the metal foil layer 13 on which the prevention treated layer 14 is formed and a surface on a side opposite to the surface on which the corrosion prevention-treated layer 14 is formed using an adhesive that forms the first adhesive layer 12 according to a dry lamination method.

In the process (2), an aging (curing) treatment may be performed in a range of room temperature to 100° C. to improve adhesiveness.

Process (3)

In a case of the thermal laminate configuration, for example, the second adhesive layer 15 is formed according to an extrusion laminate method on the corrosion prevention-treated layer 14 of the laminated body in which the base material layer 11, the first adhesive layer 12, the metal foil layer 13, and the corrosion prevention-treated layer 14 are laminated in this order, and the sealant layer 16 is laminated by sandwich lamination.

In the case of a dry laminate configuration, for example, the sealant layer 16 is laminated on the corrosion prevention-treated layer 14 of the laminated body by using the above-described adhesive according to a method such as dry lamination, non-solvent lamination, and wet lamination with the second adhesive layer 15 interposed between the corrosion prevention-treated layer 14 and the sealant layer 16.

According to the above-described processes (1) to (3), the packaging material 1 can be obtained.

In addition, the method of manufacturing the packaging material 1 is not limited to the method in which the processes (1) to (3) are sequentially performed. For example, the process (1) may be performed after performing the process (2). In addition, the corrosion prevention-treated layer may be provided on both surfaces of the metal foil layer.

The above-described packaging material for a lithium ion battery of the invention has excellent moldability and excellent durability after molding. In addition, the packaging material for a lithium ion battery of the invention is not limited to the packaging material 1. For example, an embodiment in which the corrosion prevention-treated layer is provided at both sides of the metal foil may be employed.

As a method of manufacturing a lithium ion battery by using the packaging material for a lithium ion battery of the invention, a known method may be employed except that the packaging material for a lithium ion battery of the invention is used. For example, the lithium ion battery may be obtained as follows. A recessed portion is formed by cold-molding at part of the packaging material for a lithium ion battery of the invention, a positive electrode, a separator, and a negative electrode are put in the recessed portion, and one sheet of the packaging material for a lithium ion battery of the invention is folded back in order for the folded portions of the sealant layer to face each other, and then three sides are heat-sealed. Then, an electrolytic solution is injected from the remaining one side at a vacuum state, and then the remaining one side is hermetically heat-sealed.

[Examples]

Hereinafter, the invention will be described in detail with reference to Examples, but the invention is not limited to the following description.

[Used Material]

Materials that were used in Examples are shown below.

(Base Material Layer 11)

Base material A-1: Biaxially-stretched nylon 6 film (10 μm).

Base material A-2: Biaxially-stretched nylon 6 film (25 μm).

Base material A-3: Laminated film (45 μm) of biaxially-stretched nylon 6 film (25 μm) and biaxially-stretched polyethylene terephthalate film (20 μm).

(First Adhesive Layer 12)

Adhesive B-1: Two-liquid curable urethane-based adhesive (molar ratio (NCO/OH)=15) of polyester polyol (main agent) and tolylene diisocyanate (curing agent).

Adhesive B-2: Two-liquid curable urethane-based adhesive (molar ratio (NCO/OH)=30) of polyester polyol (main agent) and tolylene diisocyanate (curing agent).

Adhesive B-3: Two-liquid curable urethane-based adhesive (molar ratio (NCO/OH)=45) of polyester polyol (main agent) and tolylene diisocyanate (curing agent).

(Metal Foil Layer 13)

Metal foil C-1: Soft aluminum foil 8079 material (manufactured by TOY( ) ALUMINIUM K.K., thickness: 40 μm).

(Corrosion Prevention-Treated Layer 14)

Treating agent D-1: Coating-type treating agent for ceria sol treatment, which contains cerium oxide, phosphate, and an acrylic resin as main substances.

(Second Adhesive Layer 15)

Adhesive component E-1: Polypropylene-based resin that is graft-modified with maleic anhydride (product name: "Admer", manufactured by Mitsui Chemicals, Inc.).

(Sealant Layer 16)

Film F-1: Film obtained by subjecting an inner-side surface of a non-stretched polypropylene film (thickness: 40 μm) to a corona treatment.

[Preparation of Packaging Material]

The treating agent D-1 was applied onto one surface of the metal foil C-1, which constitutes the metal foil layer 13, and was dried to form the corrosion prevention-treated layer 14. Next, the base material layer 11 having a configuration shown in Table 1 was laminated on a surface of the metal foil layer 13, which is opposite to the corrosion prevention-treated layer 14, with the first adhesive layer 12 (thickness: 4 μm) interposed therebetween by using an adhesive shown in Table 1 according to a dry laminate method. Then, aging was performed at 60° C. for 6 days. Next, the adhesive component E-1 was extruded by an extruder toward the corrosion prevention-treated layer 14 of the laminated body that was obtained, and the film F-1 was bonded and sandwich lamination was performed, thereby forming the sealant layer 16 with the second adhesive layer 15 (thickness 20 μm) interposed between the corrosion prevention-treated layer 14 and the sealant layer 16. Then, the laminated body, which was obtained, was heated and compressed under the conditions of 160° C., 4 kg/cm², and 2 m/minute), thereby preparing the packaging material.

[Measurement of Adhesive]

A test specimen having a sample width of 6 mm was cut from the packaging material obtained in each Example, the test specimen was mounted on chucks of a stretching machine with a distance between chucks set to 10 mm, and stretching was performed at a stretching rate of 300 mm/minute in such a manner that an amount of elongation of the test specimen became 5 or 10 mm. Then, adhesivity between the base material layer 11 and the metal foil layer 13 was measured with respect to each of the test specimen after stretching by 5 mm and the test specimen after stretching by 10 mm With regard to the adhesivity (unit: N), a notch was formed between the base material layer 11 and the metal foil layer 13 of the test specimen, the base material layer 11 and a laminated portion from the metal foil layer 13 to the sealant layer 16 were gripped, and the adhesivity was measured under the conditions of T-type peeling and a peeling rate of 30 mm/minute. Measurement results of the adhesivity are classified as follows.

(Adhesivity after Stretching)

G-1: The adhesivity after the test specimen was stretched by 5 mm was 5 N or less, and the adhesivity after the test specimen was stretched by 10 mm was less than 2 N.

G-2: The adhesivity after the test specimen was stretched by 5 mm was 5 N or less, and the adhesivity after the test specimen was stretched by 10 mm was 2 N or more.

G-3: The adhesivity after the test specimen was stretched by 5 mm was more than 5 N, and the adhesivity after the test specimen was stretched by 10 mm was less than 2 N.

[Measurement of Maximum Amount of Elongation]

The test specimen of the packaging material that was obtained was stretched under the same stretching conditions as the measurement of the adhesivity until the test specimen was fractured, thereby measuring the maximum amount of elongation. Measurement results of the maximum amount of elongation of the test specimen are classified as follows.

(Maximum Amount of Elongation)

H-1: The maximum amount of elongation of the test specimen was less than 10 mm.

H-2: The maximum amount of elongation of the test specimen 10 to 20 mm.

H-3: The maximum amount of elongation of the test specimen was more than 20 mm.

[Evaluation of Moldability]

The packaging material that was obtained in each Example was cut in a blank shape having a length of 150 mm and a width of 190 mm, and cold-molding was performed while changing a molding depth to evaluate moldability. As a punch for use therein, a mold which has a shape having a length of 100 mm and a width of 150 mm and in which a punch corner R (RCP) was 1.5 mm, a punch shoulder R (RP) was 0.75 mm, and a die shoulder R (RD) was 0.75 mm was used. Evaluation was made on the following standard.

"Excellent": Deep drawing in a molding depth of 7 mm or more was possible without causing fracturing and cracking in the packaging material.

"Good": Deep drawing in a molding depth equal to or more than 5 mm and less than 7 mm was possible without causing fracturing and cracking in the packaging material.

"Bad": Fracturing occurred in deep drawing in a molding depth less than 5 mm, and cracking occurred in the packaging material.

[Evaluation of Durability after Molding]

The packaging material, which was obtained in each Example, was molded in a molding depth of 5 mm with the same molding die as the molding die used for evaluation of the moldability, the packaging material was left as for 30 days under environment of 60° C. and 95% RH, and then peeling of the base material layer was visually observed. Evaluation was made on the basis of the following standard.

"Excellent": Discoloration of the base material layer and peeling between the base material layer and the metal foil layer were not observed.

"Good": The base material layer of a molded portion discolors white but peeling between the base material layer and the metal foil layer was not observed.

"Bad": Peeling occurred between the base material layer and the metal foil layer of the molded portion.

Examples 1 and 2, and Comparative Examples 1 to 3

Packaging materials having configurations shown in Table 1 were prepared according to the above-described preparation method. Evaluation results of the moldability and the durability after molding are shown in Table 1.

TABLE 1

| | Base material layer 11 | First adhesive layer 12 | Adhesivity after stretching | | | Maximum amount of elongation | | Moldability | Durability |
|---|---|---|---|---|---|---|---|---|---|
| | | | Stretching by 5 mm | Stretching by 10 mm | Classification | [mm] | Classification | | |
| Example 1 | A-1 | B-2 | 3.5 | 2.0 | G-2 | 10 | H-2 | Good | Excellent |
| Example 2 | A-2 | B-2 | 4.0 | 2.5 | G-2 | 15 | H-2 | Excellent | Excellent |
| Comparative Example 1 | A-3 | B-2 | 5.0 | 3.0 | G-2 | 20 | H-2 | Excellent | Bad |
| Comparative Example 2 | A-2 | B-1 | 6.0 | 1.0 | G-3 | 25 | H-3 | Good | Bad |
| Comparative Example 3 | A-2 | B-3 | 4.0 | 0 | G-1 | 9 | H-1 | Bad | None |

As shown in Table 1, in packaging materials of Examples 1 and 2 in which the thickness of the base material layer 11 was 15 to 40 μm, the adhesivity after stretching the test specimen by 5 mm was 5 N or less, and the adhesivity after stretching the test specimen by 10 mm was 2 N or more, excellent moldability and excellent durability after molding were obtained. Particularly, in a packaging material of Example 2 in which a polyamide film having a thickness of 25 μm was used as the base material layer 11, molding in a molding depth of 7 mm or more was possible, and the moldability was more excellent.

On the other hand, in a packaging material of Comparative Example 1 in which the adhesivity after stretching the test specimen by 5 mm was 5 N or less, and the adhesivity after stretching the test specimen by 10 mm was 2 N or more, but the thickness of the base material layer 11 was 45 μm, excellent moldability was obtained. However, peeling between the base material layer and the metal foil layer was observed in an environmental test after molding, and thus the durability after molding was bad. In addition, in a packaging material of Comparative Example 2 in which the adhesivity after stretching the test specimen by 5 mm was more than 5 N, and the adhesivity after stretching the test specimen by 10 mm was less than 2 N, the moldability was excellent. However, the durability after molding was bad. Furthermore, in a packaging material of Comparative Example 3 in which the adhesivity after stretching the test specimen by 5 mm was 5 N or less, and the adhesivity after stretching the test specimen by 10 mm was less than 2 N, sufficient moldability was not obtained.

What is claimed is:

1. A cold-molded packaging material for a lithium ion battery, comprising:
    a base material layer having a thickness of 15 to 40 μm; and
    sequentially laminated on one surface of the base material layer,
        a first adhesive layer comprising a urethane-based adhesive formed by a reaction, between a hydroxyl group of a main agent and an isocyanate group of a curing agent, in which a molar ratio (NCO/OH) of an isocyanate group of the curing agent to a hydroxyl group of the main agent is 25 to 40, the first adhesive layer having a thickness in a range of 1 to 10 μm, the curing agent being a bifunctional or multifunctional, aromatic or aliphatic isocyanate, and the main agent including polyol,
        a metal foil layer,
        a corrosion prevention-treated layer,
        a second adhesive layer, and
        a sealant layer.

2. The cold-molded packaging material for a lithium ion battery according to claim 1, wherein
    the base material layer is a single-layer film constituted by a polyamide film or a laminated film in which a polyester film and a polyamide film are laminated from an outer side.

* * * * *